US009253629B2

(12) United States Patent
Redell et al.

(10) Patent No.: US 9,253,629 B2
(45) Date of Patent: Feb. 2, 2016

(54) METHOD OF HANDLING MOBILE STATION IDENTIFIERS

(75) Inventors: Karen Lee Redell, Naperville, IL (US);
Douglas Harold Rollender, Somerset, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1103 days.

(21) Appl. No.: 11/476,005

(22) Filed: Jun. 28, 2006

(65) Prior Publication Data

US 2008/0004001 A1 Jan. 3, 2008

(51) Int. Cl.
*H04M 3/00* (2006.01)
*H04W 8/26* (2009.01)

(52) U.S. Cl.
CPC ........................................ *H04W 8/26* (2013.01)

(58) Field of Classification Search
CPC ....... H04W 8/26; H04W 12/06; H04W 60/00;
H04W 28/18; H04W 48/08; H04W 92/02;
H04W 36/00; H04W 36/14; H04W 28/26;
H04W 36/12; H04W 4/001; H04W 76/028;
H04W 88/02; H04W 88/16; H04W 8/12;
H04W 92/24; H04W 36/0083; H04W
36/0016; H04W 36/0055; H04W 24/02;
H04W 36/08; H04W 36/0005; H04W 36/18;
H04W 36/0022; H04W 84/005; H04W 88/08;
H04W 72/0486; H04W 12/08
USPC .................... 455/415, 425, 343.3; 370/395.3;
379/88.19, 69, 88.2, 88.21, 93.03, 118,
379/120, 127.06, 183, 207.14
See application file for complete search history.

(56) References Cited

U.S. PATENT DOCUMENTS

| | | | |
|---|---|---|---|
| 6,464,743 B2 * | 10/2002 | Kanno et al. ..................... | 55/450 |
| 6,563,919 B1 * | 5/2003 | Aravamudhan et al. ...... | 379/230 |
| 7,463,884 B2 * | 12/2008 | Majmundar et al. .......... | 455/419 |
| 2004/0242215 A1 | 12/2004 | Chambers | |
| 2004/0242245 A1 | 12/2004 | Sliva | |

FOREIGN PATENT DOCUMENTS

JP  2006050123  2/2006
WO  2004/107796  12/2004

OTHER PUBLICATIONS

Hunter, Andrew, "*MIN Based IMSI and True INSI*", XP002424424, http://www.cdg.org/news/events/cdmasem/inar/05_LatinAm/op_roam_meeting/ISSUES%200F%20MIN%20BASED%20AND%20TRUE%20IMSI-%20QC.pdf, Apr. 18, 2005.
Chambers, Mike, "*Applying Lucent's CDMA Full International Mobile Station Identity (IMSI) Feature for Enhanced Preferred Roaming List (PRL)*", XP002426346, http://www.cdg.org.news/events/cdmaseminar/04_PRL/Lucent%20v4.pdf, Feb. 2004.
ISR and Written Opinion dated Dec. 21, 2007.
Office Action dated Jun. 11, 2010 with English translation and prepared response for corresponding Chinese Patent Application No. 200780023734.X.

(Continued)

*Primary Examiner* — Nimesh Patel
(74) *Attorney, Agent, or Firm* — Harness, Dickey & Pierce, P.L.C.

(57) ABSTRACT

In an embodiment of the method of handling mobile station identifiers, at least one network element that used entire mobile station identifiers in performing packet data session handling functions is programmed to use less than the entire mobile station identifiers.

11 Claims, 2 Drawing Sheets

(56) References Cited

OTHER PUBLICATIONS

Office Action dated Aug. 24, 2011 with English translation for Chinese Patent Application No. 200780023734.X.

Israeli Office Action dated Jun. 14, 2012, issued in Application No. 196103 and English translation thereof.
Notification of Reason for Refusal for JP 2009-518174, dated Jun. 18, 2012, and English translation thereof.

\* cited by examiner

METHOD OF HANDLING MOBILE STATION IDENTIFIERS

BACKGROUND OF THE INVENTION

1. Field of the Invention

The present invention relates to telecommunications, and more particularly, to wireless telecommunications.

2. Description of Related Art

In the field of wireless telecommunications, a system typically includes a plurality of base transceiver stations distributed within an area to be serviced by the system. Various users within the area, fixed or mobile, may then access the system, and, thus, other interconnected telecommunications systems, via one or more of the base transceiver stations. Typically, a mobile device maintains communication with the system as the mobile device passes through an area by communicating with one and then another base transceiver station, as the user moves. The mobile device may communicate with the closest base transceiver station, the base transceiver station with the strongest signal, the base transceiver station with a capacity sufficient to accept communications, etc.

Circuit and packet data communication with a wireless subscriber are handled and routed by way of the mobile station identification ("MSID"). The MSID may typically be characterized as either a 10-digit mobile identification number ("MIN") or a 15-digit International Mobile Subscriber Identifier ("IMSI"). All references to MIN in this document also include the International Roaming MIN [IRM] assigned to service providers outside North America. The MIN is a 10-digit number typically formatted like a dialable 10-digit Mobile Directory Number (MDN). However, MIN is not defined as a dialable number. The IMSI is a 15-digit non-dialable number based on ITU-T Recommendation E.212, and therefore, is not interchangeable with a 10-digit MDN. The format of the IMSI is given below:

IMSI (15 digits)=MCC (3 digits)+MNC (up to 3 digits)+MSIN (all remaining digits)

The mobile country code (MCC) forms the first three digits of the IMSI and identifies the country in which the home system is located. Together with the mobile network code (MNC), which consists of no more than the next 3 digits, the MCC+MNC forms a home system code identifying the home system. The Mobile Subscriber Identification Number (MSIN) uniquely identifies the mobile subscriber within the home system. The IMSI is used in various standards around the world. The IMSI may be programmed into a wireless unit or a Subscriber Identity Module ("SIM") card by the service provider with whom the wireless unit user has entered into a service agreement.

While MIN and IMSI are not interchangeable, standards have defined a MIN-based IMSI (MBI) to assist in the migration from MIN to IMSI as a subscriber identifier. The MBI is formatted like an IMSI except the first five digits are not assigned to a service provider and, therefore, are not carrier specific for network addressing, routing, billing or settlement purposes. The last 10-digits of the MBI consist of the MIN Typically, the IMSI as defined by ITU-T Recommendation E.212 is referred to as the true-IMSI or IMSI_T to contrast this IMSI format with the MIN-based-IMSI (also referred to as IMSI_M and MBI).

Unfortunately, due to a lack of clarity in the standards, there is a lack of consistency between service providers, such as CDMA service providers, in their programming and use of MBI and true-IMSI as subscriber identifiers. While each identifier and its use are defined as separate and unique identifiers, they serve similar if not identical functions. However, according to current standards, they are non-interchangeable or interoperable, and this may result in inefficient handling of subscribers roaming across such systems. This problem is being addressed in this invention.

SUMMARY OF THE INVENTION

In an embodiment of the method of handling mobile station identifiers, at least one network element that used entire mobile station identifiers in performing packet data session handling functions is programmed to use less than the entire mobile station identifiers. Here, mobile stations are programmed with the same MIN-based-IMSI and true-IMSI, and the last 10-digits of the IMSIs are the same as the MIN used in MIN based network elements.

For example, even though a 15-digit MIN-based-IMSI is received, the 10 digit MSIN portion of the IMSI is used in performing packet data session handling functions. Accordingly, this 10-digit portion will match the 10-digit MIN used MIN based network elements.

Examples of packet data session handling functions include handoff, dormant closure, border cell call delivery, etc.

Example of network elements programmed in this fashion include packet data service nodes, packet control functions, etc.

BRIEF DESCRIPTION OF THE DRAWINGS

The present invention will be better understood from reading the following description of non-limiting embodiments, with reference to the attached drawings, wherein below.

DETAILED DESCRIPTION OF EXAMPLE EMBODIMENTS

Architecture

Embodiments of the present invention will be described with respect to a CDMA communication system or network. For example, the CDMA 2000 cellular telecommunications network is a third generation (3G) circuit mode and packet data-based cellular telecommunications network that uses the Code Division Multiple Access (CDMA) radio access technology for providing high-speed wireless service to mobile stations (MSs). The services include interactive and background type of traffic classes, as well as conversational and streaming type of services, such as voice, text, internet and multimedia applications.

An exemplary IP-based CDMA 2000 cellular telecommunications network includes a plurality of mobile stations communicating over a radio interface with base transceiver stations (BTS). Each group of one or more BTSs is connected to, and controlled by a base station controller (BSC) and a packet control function (PCF), which manage the radio resources of each co-operating BTS. One or more mobile switching centers (MSCs) may be connected to the IP-based CDMA 2000 cellular packet data telecommunications network for the provision of cellular service to subscribers, while a packet data service node (PDSN) performs the switching and routing functions directed to the packet data communications within the CDMA 2000 cellular telecommunications network.

The CDMA 2000 packet-data cellular telecommunications network provides IP service to packet mobile users. IP service is generally provided over a Point-to-Point Protocol (PPP) connection between the mobile station and the PDSN. When a PPP connection is established, negotiation messages are exchanged between the mobile station and the PDSN with regards to authentication and compression, followed by the mobile station's IP registration. Thereafter, data may be sent from and to the mobile station, such as for example during a voice conversation or a file download. However, the mobile station becomes dormant when no data is transmitted for a certain period of time over the PPP connection. In instances when the mobile station is dormant, there is no traffic channel assigned to the mobile, although the PPP connection is maintained in both the mobile station and the PDSN.

Figure 1:
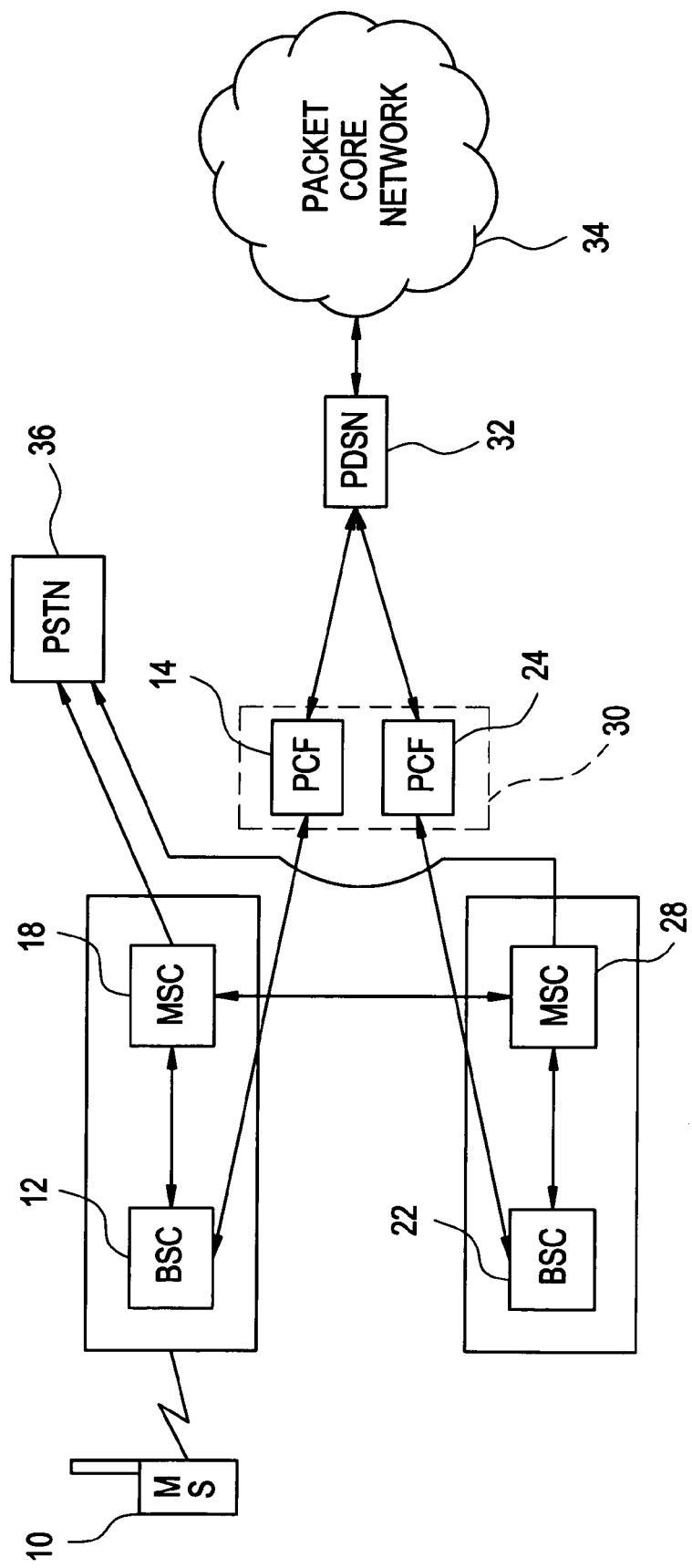
FIG. 1 illustrates a wireless communication system according to an embodiment of the present invention.

Reference is now made to FIG. 1, wherein there is shown a wireless communication system according to an embodiment of the present invention. As shown, at least one mobile station (MS) 10 communicates over an air (radio) interface via a plurality of base transceiver stations (BTSs, not shown) and a plurality of base station controllers (BSCs), such as for example BSCs 12 and 22. The mobile station 10 may take the form of any of a variety of devices, including cellular phones, personal digital assistants (PDAs), laptop computers, digital pagers, wireless cards, and any other device capable of accessing a data network.

The BSCs 12 and 22 may each be associated with a respective packet control function (PCF) unit 14 and 24. Alternatively, the BSCs 12 and 22 may functionally include the packet control function of the PCFs 14 and 24, respectively. As a still further alternative, more than one BSC such as BSCs 12 and 22 may be associated with the same PCF unit. This is illustrated by the dashed block label 30 in FIG. 1. It will be understood, the PCF unit 30 is a single PCF unit serving both BSCs 12 and 24 as opposed to containing two separate PCF units.

The system of FIG. 1 may further comprise mobile switching centers (MSCs) 18 and 28 coupled to BSCs 12 and 22, respectively. Those skilled in the art will appreciate that a plurality of MSCs may be utilized to interface with a large number of BSCs, and that a single MSC may interface with more than one BSC. FIG. 1 shows a single BSC interfacing with a single MSC only for the sake of clarity. The MSCs perform several management roles well known in the art (e.g., managing registration, handoff, etc.) as well as providing connectivity to a circuit signaling network such as a public switched telephone network (PSTN). Generally, the MSCs use the Mobile Station IDentity (MSID) provided by the mobile station 10 to control circuit call routing.

The system of FIG. 1 may still further include a plurality of packet data service nodes (PDSNs), such as for example PDSN 32. While not shown, the BSCs, PCFs and the PDSNs may be connected with each other through an IP-based network. A PDSN provides connectivity (e.g., acts as a gateway) to a packet network such as the Internet. FIG. 1 illustrates a single PDSN 32 connected to a single packet core network 34 for the sake of clarity. The PCFs and PDSNs use the Mobile Station IDentity (MSID) provided by the mobile station 10 to control packet data session handling and routing.

Thus, those skilled in the art will appreciate that the communications system of FIG. 1 facilitates communications between the mobile stations 10 and the packet core network 34 and/or the PSTN 36. It should be understood, however, that the configuration of the communications system of FIG. 1 is exemplary in nature, and that fewer or additional components may be employed in other embodiments of the communications system without departing from the present invention.

Mobile Station Identifier or Identity (MSID)

Those skilled in the art will appreciate that in the United States, each of the mobile stations 10 has historically used a unique Mobile Station IDentity (MSID) that is comprised of a Mobile Identification Number (MIN). In existing standards, the MIN is 10-digits long. The MIN is assigned and administered by a MIN Block Administrator for wireless service providers in North America and an International Roaming MIN Administrator for wireless service providers outside North America. Under existing standards, each mobile station 10 is allowed to be programmed with two identifiers. One identifier is a 15-digit "true-IMSI" as defined by ITU-T Recommendation E.212. The other identifier is a "MIN-based-IMSI" or MBI as described in the Background of the Invention section. As discussed, the MIN-based-IMSI consists of a 10-digit MIN preceded by a 5-digit "default" network identifier that is not unique (i.e., does not uniquely identify a service provider) and, therefore, can not be used for service provider identification, routing, Enhanced Preferred Roaming List, etc.

In one embodiment of the instant invention, each mobile station is programmed with the same number in both the true-IMSI and the MIN-based-IMSI fields as discussed in detail below.

Figure 2A:
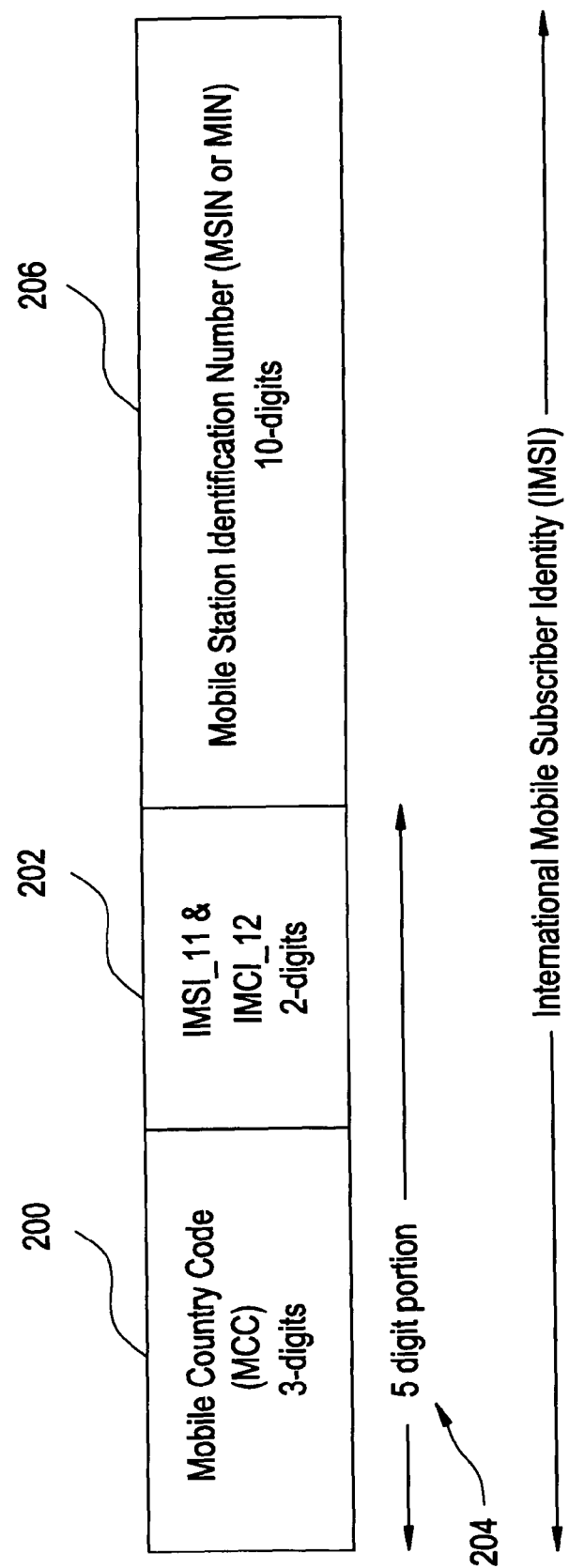
FIG. 2A illustrates a representation of an IMSI numbering scheme according to an embodiment of the present invention.

Referring now to FIG. 2A, in one embodiment of the instant invention, the true-IMSI and the MIN-based-IMSI are selected to be identical, and each takes the form of a 15-digit number: a 3-digit Mobile Country Code (MCC) 200, a following 2-digits 202, and the Mobile Station Identification Number (MSIN) 206. The two digits 202 following the MCC 200 are the $11^{th}$ and $12^{th}$ digits of the IMSI and may be referred to as IMSI_11_12. The MCC and the IMSI_11_12 form a 5 digit portion 204. The MSIN 206 is located in the least significant 10-digits of the true-IMSI and the MIN-based-IMSI, and may be formed from the conventional 10-digit MIN. This scheme for establishing the IMSI differs from current standards for IMSI, which do not anticipate MBI and true-IMSI to be the same or that a MIN is in the last 10 digits of both the MBI and the true-IMSI.

Additionally, the MIN 206 corresponds to and may be used as the MIN for the mobile station 10 when the home network of the mobile station or a visited network serving a roamer supports the use of MINs. This is because the MIN number space is assigned by an authority to ensure a unique MIN is assigned to each wireless subscriber. It is anticipated that in one embodiment of the instant invention, service providers will no longer require MIN administration to ensure MIN uniqueness and that each service provider will have authority to administer their own MSINs. That is, unlike MIN, each service provider is allowed to assign MSINs 206 without regard to other service providers. Thus, those skilled in the art will appreciate that within the instant invention it is possible for two service providers to assign identical MSINs 206 to two different mobile stations. However, the two mobile stations will have non-identical 5-digit portions 204, yielding a 15-digit IMSI that is unique throughout the world. As the entire 15-digit IMSI is presented by a roaming mobile station when it first attempts to access a serving system, the serving system can use the MCC+IMSI_11_12 to identify a roaming subscriber and the roaming subscriber's home service provider. Those skilled in the art will appreciate that this numbering scheme will alleviate the near-term exhaustion of 10-digit MINs 206 currently facing the industry. Additionally, as discussed in detail below, when a mobile station 10 is within its home network, it may continue to use its 10-digit MSIN, rather than the 15-digit IMSI, as the 10-digit MSIN 206 is sufficient to uniquely identify each mobile station 10 within its home network.

Further, international roaming is supported without the additional IMSI administration, assignment, and provisioning required for using two kinds of IMSI, the MIN-based-IMSI and the true-IMSI. Both kinds of IMSI may now use the same 5-digit portion 204 of MCC+IMSI_11_12 rather than requiring separate MCC+MNC assignments. Moreover, the numbering scheme of the present invention is consistent with current E.214 GTT implementations that support a 5-digit MCC+MNC.

Further, since the proposed numbering scheme eliminates the use of a 6-digit MCC+MNC as in some standards, modifications to the enhanced Preferred Roaming List (ePRL) is not required. Use of the ePRL requires (a) the base station to broadcast a 5-digit MCC+IMSI_11_12 for the potential serving system to identify itself and (b) the mobile station 10 to use this 5-digit MCC+IMSI_11_12 to select a serving system to access by comparing the 5-digit portion to a priority listing of 5-digit portions for preferred roaming partners programmed into the mobile station 10. The 5-digit MCC+IMSI_11_12 is broadcast over the air by the base transceiver stations inside an Extended System Parameter Message (ESPM). With the 5-digit MCC+IMSI_11_12 inside the ESPM, mobile ePRLs with 5-digit MCC+IMSI_11_12s do not need to be reprogrammed. Likewise, modifications to IS-2000 to support 6-digit MCC+MNCs and modifications to IS-683 to provision mobiles over-the-air with a modified ePRL are not required as long as MCC+IMSI_11_12 is unique for each service provider. This can be accomplished, for example, if a country chooses to assign a 3-digit MNC by assigning each service provider a block of 10 MNCs. In this way, the service provider may use the last digit of any one of 10 MNC assignments to be of the first digit of the 10-digit MIN in the MSIN number space. Therefore, it will be appreciated that the 6-digit MCC plus MNC assignments, such as in the United States, may still be supported.

Inter-System Packet Data Service

With the subscriber identity programmed into end user devices as described above and radio access networks using either the MIN or IMSI form of subscriber identification as prescribed in existing standards, according to embodiments of the present invention, inter-system packet data service may be provided to subscribers without concern for collision of different MSID's through the performance of inter-system operations that would result in service interruption. According to the present invention, network elements such as the PCF and the PDSN in a home, visited, serving or target system may use the same 10-digit MSIN for any single subscriber to provide un-interrupted service to a subscriber through standard intersystem operations until these system service providers agree to provide service based on a full 15 digit IMSI. For example, the PCFs and PDSNs performing functions using the MIN-based-IMSI are programmed to perform their IMSI based function using the last 10-digits or MSIN portion of the IMSI. For example, the PDSNs such as PDSN 32 are programmed in this fashion, the PCF units such as PCF unit 30 are programmed in this fashion, etc. The benefits of this programming will be described in detail below with respect to an example.

Example 1

Roaming from MIN Based Network Element to MIN-Based-IMSI Network Element

For example, assume the BSC 12 and MSC 18 are MIN based; namely, they use the MIN as the MSID of the mobile station 10 in a conventional manner. Also assume that the BSC 22 and the MSC 28 use a MIN-based-IMSI as the MSID of the mobile station 10. When the mobile station roams from the BSC 12 to the BSC 22, the PDSN 32 identifies the current data session of the mobile station 10 with the BSC 12 using the MIN. When the BSC 22 attempts to establish itself as the serving BSC for the mobile station 10, the BSC 22 communicates the MIN-based-IMSI of the mobile station 10 to the PDSN 32. Because the MIN and the MIN-based-IMSI do not match (e.g., they do not even include the same number of digits), conventionally, the PDSN 32 does not recognize the BSC 22 as attempting to continue the data session of the mobile station 10. Instead, the PDSN 32 recognizes the BSC 22 as attempting to establish a new data session. Accordingly, the signaling to set up a new BSC 22 data session, and eventually end the old BSC 12 data session will be performed.

However, according to the present invention, the PDSN 32 is programmed to operate using the last 10-digits of a received MSID. In the example given above, the PDSN 32 operating according to the present invention recognizes the 10-digit MIN used by the BSC 12 for the mobile station 10 as matching the 10-digit MSIN portion of the MIN-based-IMSI used by the BSC 22 for the mobile station 10. Accordingly, the PDSN 32 transfers the data session from the BSC 12 to the BSC 22 without the inefficiencies discussed above.

As was mentioned above, a single PCF unit 30 may serve both the BSC 12 and the BSC 22. Accordingly, the same MSID mismatch can occur at a conventional PCF unit, but does not occur at the PCF unit according to the present invention.

Furthermore, while only one example of the benefits of the present invention were described above, those skilled in the art will readily appreciate that numerous other examples exist (e.g., MIN-based-IMSI to MIN roaming, MIN-based-IMSI to MIN-based-IMSI roaming, etc.). Furthermore, while the example was given with respect to mobile station handoff, those skilled in the art will understand that similar examples and benefits exist with respect to dormant closure, border cell call delivery, etc.

Benefits in Detail

As discussed above, according to one embodiment of the present invention, to avoid mismatches only the last 10 digits of the MSID provided to the interface (e.g., the PDSN 32 and the PCF 30) to the packet core network 34 are used to uniquely identify the subscriber. This implies the service provider and roaming partners are still in MIN Administration. This allows MIN-based-IMSI network elements to inter-network with legacy MIN based network elements.

However, over time, the legacy MIN based network elements are expected to be converted to MIN-based-IMSI and/or true-IMSI based network elements. When a MIN-based-IMSI network element or true-IMSI network element is no longer inter-networked (e.g., connected) with a MIN based network element, then the network elements performing functions using the true-IMSI or MIN-based-IMSI are reprogrammed to perform their IMSI based function using a full 15-digit IMSI. Even when this reprogramming takes place, mismatches may be avoided if the true-IMSI and MIN-based-IMSI of the mobile station are programmed to match as discussed above with respect to embodiments of the present invention.

Eventually, it is anticipated that use of only the true-IMSI network elements may be achieved. At that time, the PCF and PDSN would be programmed to function based on the 15-digit MSID already programmed into end user devices. Re-programming of mobile terminal devices would not be required.

The invention being thus described, it will be obvious that the same may be varied in many ways. Such variations are not to be regarded as a departure from the invention, and all such modifications are intended to be included within the scope of the invention.

We claim:

1. A method of handling mobile station identifiers, comprising:
   programming at least one network element that used entire mobile station identifiers in performing packet data session handling functions between a control element on a first network and a control element on a second network to use less than the entire mobile station identifiers in communication between the control element on the first network and the control element on the second network, the second network being different from the first network;
   comparing, at the at least one network element, a partial portion of a mobile station identifier associated with the control element on the first network with a partial portion of a mobile station identifier associated with the control element on the second network; and
   performing, at the at least one network element, the packet data session handling functions based on the comparing such that the at least one network element transfers a current data session of a mobile station established with the control element on the first network to the control element on the second network without performing a new signaling operation if the partial portion of the mobile station identifier associated with the control element on the first network matches the partial portion of the mobile station identifier associated with the control element on the second network,
   wherein the programming programs a packet data service node or a packet control function unit, and
   wherein the packet data session handling functions include at least one of handoff, dormant closure, and border cell call delivery.

2. The method of claim 1, wherein the programming programs the at least one network element such that the network element uses a least significant 10-digits of the mobile station identifiers.

3. The method of claim 2, wherein the at least one network element used 15-digit mobile station identifiers prior to the programming.

4. The method of claim 3, wherein the at least one network element used 15-digit international mobile subscriber identifiers, IMSIs, prior to the programming.

5. The method of claim 1, wherein the at least one network element used 15-digit mobile station identifiers prior to the programming.

6. The method of claim 5, wherein the at least one network element used 15-digit international mobile subscriber identifiers, IMSIs, prior to the programming.

7. The method of claim 6, wherein the programming programs the at least one network element to use the 10-digit mobile identification number portion of the IMSIs.

8. The method of claim 1, further comprising:
   re-programming the network element to use in the entire mobile station identifiers in performing packet data session handling functions.

9. A method of handling mobile station identifiers, comprising:
   using less than an entire mobile station identifier in communication between a control element on a first network and a control element on a second network when performing packet data session handling functions between the control element on the first network and the control element on the second network, the second network being different from the first network;
   comparing a partial portion of a mobile station identifier associated with the control element on the first network with a partial portion of a mobile station identifier associated with the control element on the second network; and
   performing, at at least one network element, the packet data session handling functions based on the comparing such that the at least one network element transfers a current data session of a mobile station established with the control element on the first network to the control element on the second network without performing a new signaling operation if the partial portion of the mobile station identifier associated with the control element on the first network matches the partial portion of the mobile station identifier associated with the control element on the second network,
   wherein the at least one network element is a packet data service node or a packet control function unit, and
   wherein the packet data session handling functions include at least one of handoff, dormant closure, and border cell call delivery.

10. The method of claim 9, wherein the using uses a least significant 10-digits of the mobile station identifiers.

11. The method of claim 10, further comprising:
   receiving a 15-digit mobile station identifier.

* * * * *